US011210181B2

(12) United States Patent
Singh et al.

(10) Patent No.: US 11,210,181 B2
(45) Date of Patent: Dec. 28, 2021

(54) SYSTEM AND METHOD FOR IMPLEMENTING DATA MANIPULATION LANGUAGE (DML) ON HADOOP

(71) Applicant: JPMorgan Chase Bank, N.A., New York, NY (US)

(72) Inventors: Jagmohan Singh, Coppell, TX (US); Prasad V. Pondicherry, Plano, TX (US); Bharaneedaran Saravanan, Irving, TX (US)

(73) Assignee: JPMorgan Chase Bank, N.A., New York, NY (US)

( * ) Notice: Subject to any disclaimer, the term of this patent is extended or adjusted under 35 U.S.C. 154(b) by 155 days.

(21) Appl. No.: 16/148,052

(22) Filed: Oct. 1, 2018

(65) Prior Publication Data

US 2019/0102263 A1   Apr. 4, 2019

Related U.S. Application Data

(60) Provisional application No. 62/565,543, filed on Sep. 29, 2017.

(51) Int. Cl.
*G06F 16/00* (2019.01)
*G06F 11/14* (2006.01)
*G06F 16/16* (2019.01)
*G06F 16/13* (2019.01)

(52) U.S. Cl.
CPC .......... *G06F 11/1469* (2013.01); *G06F 16/13* (2019.01); *G06F 16/168* (2019.01); *G06F 2201/84* (2013.01)

(58) Field of Classification Search
CPC .............................. G06F 16/168; G06F 16/13
See application file for complete search history.

(56) References Cited

U.S. PATENT DOCUMENTS

| | | | |
|---|---|---|---|
| 8,543,596 B1* | 9/2013 | Kostamaa | G06F 16/182 707/770 |
| 9,501,550 B2 | 11/2016 | Zhang | |
| 9,626,411 B1* | 4/2017 | Chang | G06F 16/10 |
| 10,615,984 B1 | 4/2020 | Wang | |
| 2014/0040575 A1 | 2/2014 | Horn | |
| 2014/0344222 A1* | 11/2014 | Morris | G06F 16/1844 707/634 |
| 2015/0248420 A1* | 9/2015 | Makkar | G06F 16/128 707/649 |
| 2016/0154866 A1* | 6/2016 | Teletia | G06F 16/2358 707/687 |
| 2016/0267132 A1* | 9/2016 | Castellanos | G06F 16/24552 |
| 2016/0283890 A1 | 9/2016 | Diehl | |
| 2017/0154039 A1* | 6/2017 | Crawford | G06F 16/11 |
| 2017/0163677 A1 | 6/2017 | Gordon | |

* cited by examiner

*Primary Examiner* — Khanh B Pham
(74) *Attorney, Agent, or Firm* — Hunton Andrews Kurth LLP

(57) ABSTRACT

An embodiment of the present invention is directed to creating a re-usable code component that may be used with the data manipulation and transformation tool to natively support DML functionality. In addition to Insert, Update, and Delete, an addition function directed to "DeDup" may be implemented as it is used frequently in data transformation processes. An embodiment of the present invention is directed to capability to roll-back to a prior version of the original dataset. Any number of versions as required may be maintained.

16 Claims, 6 Drawing Sheets

SYSTEM AND METHOD FOR IMPLEMENTING DATA MANIPULATION LANGUAGE (DML) ON HADOOP

CROSS REFERENCE TO RELATED APPLICATIONS

This application claims priority to U.S. Provisional Application 62/565,543, filed Sep. 29, 2017, the contents of which are incorporated herein in its entirety.

FIELD OF THE INVENTION

The invention relates generally to a system and method for implementing data manipulation language on Hadoop Distributed File System (HDFS).

BACKGROUND OF THE INVENTION

Hadoop is an open source software framework used for distributed storage and processing of big data. The core of Hadoop includes a storage component—Hadoop Distributed File System (HDFS)—which is a distributed, scalable, and portable file system written in Java for the Hadoop framework. A Hadoop cluster has nominally a single namenode plus a cluster of datanodes, where each datanode serves up blocks of data over the network using a block protocol specific to HDFS. Hadoop is built for big data analytics and insights. Hadoop is a highly scalable storage platform that is designed to process very large data sets across hundreds as well as thousands of computing nodes that operate in parallel.

Traditional Database Management Systems (DBMS) support data manipulation language (DML) that includes Insert, Updates, and Deletes. DML generally refers to syntax elements used for selecting, inserting, deleting and updating data in a database. HDFS does not support DML natively. As a result, data manipulation and transformation on native HDFS becomes very inefficient to develop in absence of DML functionality. For example, updating 10 records in a large file of 30 million records requires several involved steps, including rewriting the entire file, creating a new file with the updated 10 records, merging the data and then rewriting a new file. The current process is inefficient and time consuming.

These and other drawbacks exist.

SUMMARY OF THE INVENTION

According to one embodiment, the invention relates to a system that implements data manipulation language on Hadoop execution procedures. The system comprises: an user interface that receives user input; a memory component that stores data manipulation data; and a computer server coupled to the user interface and the memory, the computer server comprising a programmed computer processor configured to perform the steps of: receiving, via the user interface, an input parameter file that identifies an action to be performed on a target data structure; identifying a corresponding file from a Hadoop Distributed File System based on a file name mapping to obfuscated file names and responsive to the target data structure; providing a rollback option after execution, in case of failures; and enabling, via the user interface, the user to perform one or more data manipulation language (DML) operations in a single iteration on the corresponding file.

According to another embodiment, the invention relates to a method that implements data manipulation language on Hadoop execution procedures. The method comprises the steps of: receiving, via an user interface, an input parameter file that identifies an action to be performed on a target data structure; identifying a corresponding file from a Hadoop Distributed File System based on a file name mapping to obfuscated file names and responsive to the target data structure; providing a rollback option after execution, in case of failures; and enabling, via the user interface, the user to perform one or more data manipulation language (DML) operations in a single iteration on the corresponding file.

The system may include a specially programmed computer system comprising one or more computer processors, interactive interfaces, electronic storage devices, and networks.

The computer implemented system, method and medium described herein provide unique advantages to entities, organizations and other users, according to various embodiments of the invention. With the various features of an embodiment of the present invention, enhanced productivity in data manipulation and transformation code development may be achieved. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to permitting, inserting, changing and/or deleting rows (or other subset of data) from a data file in HDFS, as well as providing rollback and de-duping functionality within HDFS. An embodiment of the present invention improves efficiencies when manipulating data files within HDFS and further minimizes and/or eliminates the need to write an entirely new file with the desired changes.

An embodiment of the present invention is directed to developing a common component that operates natively on the Hadoop File System to automatically and efficiently perform functions, including Insert, Update, Delete and DeDup. For example, DeDup may be implemented as it is used frequently in data transformation processes to provide a capability to roll-back to a prior version of the original dataset. Any number of versions as required may be maintained. Other functions may be developed and provided by the common component. The functions may also be customized based on specific applications and environments. The common component may represent a standalone application or code that executes on various platforms and devices. For example, the common component may represent a centralized platform level process (or processes) that may be maintained by ETL Center of Excellence (COE) team and these processes may be further used across multiple lines of businesses.

An embodiment of the present invention is directed to creating a re-usable common code component that may be used with the data manipulation and transformation tool to natively support DML functionality. The tool may be executed on various high-volume data processing applications, including Ab-initio and others.

An embodiment of the present invention is directed to providing a unique design pattern to support DML functionality on HDFS with obfuscated file names in the Hadoop environment. The various features of an embodiment of the present invention may be applied to any data manipulation and transformation process using the DML functionality on obfuscated file names. An embodiment of the present invention may be realized as a common component that may be executed and/or used by any data team in an organization or entity.

Figure 1:
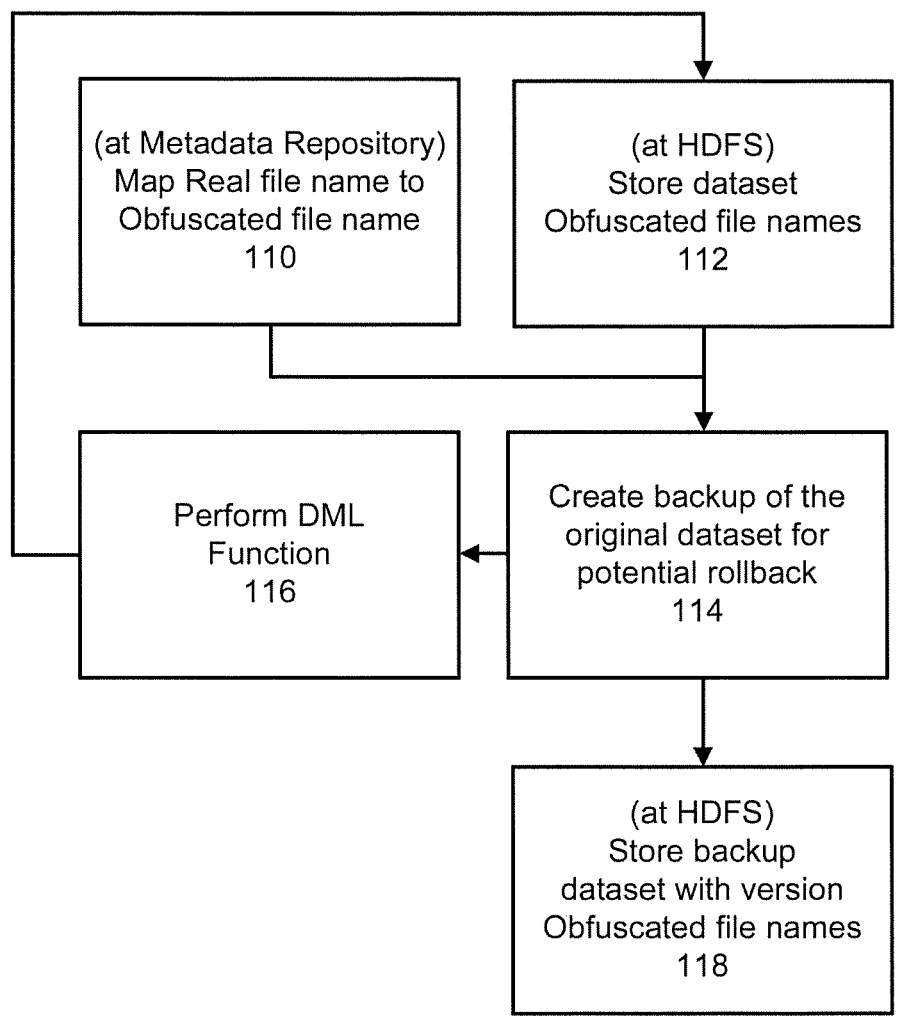
FIG. 1 is an exemplary system diagram implementing data manipulation language on Hadoop File System, according to an embodiment of the present invention.

FIG. 1 is an exemplary system diagram of implementing data manipulation language on Hadoop File System, according to an embodiment of the present invention. As shown in FIG. 1, a metadata repository may map a real file name to an obfuscated file name, at step 110. At step 112, HDFS may store a dataset of obfuscated file names. The system may create a backup of the original dataset for a potential rollback, at step 114. The system may then perform a DML function, at step 116. HDFS may store the backup dataset with a version of obfuscated file names, at step 118.

An embodiment of the present invention is directed to performing DML operations, including Insert, Updates, Deletes, etc., on Hadoop File System (HDFS). In a traditional data warehouse, ETL (extract, transform and load) processes require performing DML updates based on business requirements. These are required to be executed to perform overrides and adjustments on traditional database platforms. In traditional systems, SQL technology provides the mechanism to perform DMLs on Oracle and Teradata platforms.

By executing commands through SQL, database platforms contain an in-built functionality to handle performing changes at a storage level. For example, Oracle/Teradata stores the data in file structures, which are not visible to end users. Insert command performs inserting specific records into target data structure (e.g., INSERT INTO TABLE A, etc.). An Update command performs changes to specific fields/records with the provided value in target data structure (e.g., UPDATE TABLE A SET COLUMN A='xyz', etc.). A Delete command deletes specific records as provided from target data structure (e.g., DELETE FROM TABLE, etc.). A DeDup function represents analytical functions (e.g., ROW_NUMBER( ) PARTITION BY key ORDER BY key ASCENDING, etc.) provided to remove duplicates from the given target data set.

An embodiment of the present invention recognizes challenges in performing DML on Hadoop. For any given target data structure to be written in Hadoop file system (HDFS), HDFS has a built in algorithm or process to split the files into smaller chunks (depending on file size) and write into different data nodes. Also, file names in HDFS are encrypted in the HDFS environment maintained in an entity's infrastructure. Performing DML operations involve building a custom process which is more challenging in terms of deploying the changes due to build iterations. An embodiment of the present invention is directed to an automated process for performing DML operations on Hadoop which may be executed based on a parameter file for any given target data structures.

An embodiment of the present invention is directed to performing DML operations on HDFS file system seamlessly. An embodiment of the present invention may generate or access an input parameter file with the required action(s) to be performed on a target entity or data structure. With an embodiment of the present invention, end users are not required to identify the encrypted file names in HDFS data nodes. An embodiment of the present invention identifies corresponding files from HDFS based on a target entity or data structure provided by the user. The innovative system provides a rollback option after execution, in case of any failures. Moreover, the system allows users to perform more than one DML operation in a single iteration.

In traditional database systems, functions and operations may be applied to the data records. However, unlike traditional database systems, Hadoop does not support the ability to perform such functions. This ability is simply not available by default on Hadoop. For example, Hadoop may maintain a large file with 40 million records. To perform an insert function of 10 records, the entire file 40 million records would need to be rewritten and then a new file would need to be created with the inserted 10 records. This may involve, creating a new file with the 10 records, updating the 40 million records plus the 10 inserted records into memory, perform a merge of the data and then rewrite the new file. For the ETL process, the current process becomes even more inefficient. For any action, e.g., insert or delete, which would normally be a one-step process, a more complex series of steps would be required. The steps would involve reading a first file, reading a second file, performing a join of the two files, writing the joined file and other operations to properly perform the action. Other solutions may involve implementing a tool on top of Hadoop, however this does not provide direct access to Hadoop files and would still require additional steps for even a simple insert or delete action.

An embodiment of the present invention is directed to providing a native solution on the Hadoop file system. Accordingly, a third party tool running on top of Hadoop is not necessarily to achieve the functionality. The system provides a common component that reads an original file, performs the action (e.g., insert a new records), create a new file and then maintain a backup of the original file to perform a rollback if such is requested. The rollback is another function that is not available on Hadoop.

Due to security reasons, Hadoop files do not store files with the original name. For example, if an account file represents account A, the names of the file may be secured with encryption. If direct access to Hadoop is provided, data may not be readily identifiable because the file names may be encrypted. According to an embodiment of the present invention, the common component performs the corresponding analysis to identify the correct file name. This may involve reading the metadata, reading a backup file and identifying a corresponding output file.

The data manipulation features of an embodiment of the present invention may be used with various applications and systems that perform ETL. Extract may include reading data from a source application; transform may involve converting the extracted data so that it can be placed into another database or target application; and load may include writing the data into the target database. For example, data may be sourced from various end user applications. This may be accomplished using a CDC file, as described in and commonly owned application U.S. Ser. No. 16/147,976, which claims priority to U.S. Provisional Application 62/565,490, the contents of which are incorporated by reference herein in their entirety. For example, the data may be manipulated, confirmed and further integrated across multiple systems of records (SORs). In this example, a SOR may provide access to an account; another SOR may provide information relating to transactions that are occurring on the account and yet another SOR may address delinquent accounts and provide support to develop a payment plan for the customer. Accordingly, multiple (and disparate) applications are sending different pieces of information for a particular account or user. Upon obtaining a full snapshot which may be generated based on CDC files, as described in U.S. Ser. No. 16/147,976 A and U.S. Provisional Application 62/565,490, the aggregated data may be analyzed, processed, manipulated and/or otherwise transformed through the data manipulation language of an embodiment of the present invention. When the account information is being transformed, such transformations may lead to updates and/or other actions. For example, account information from application A and delinquency data from application B may be combined by updating account information in application A accordingly.

Figure 2:
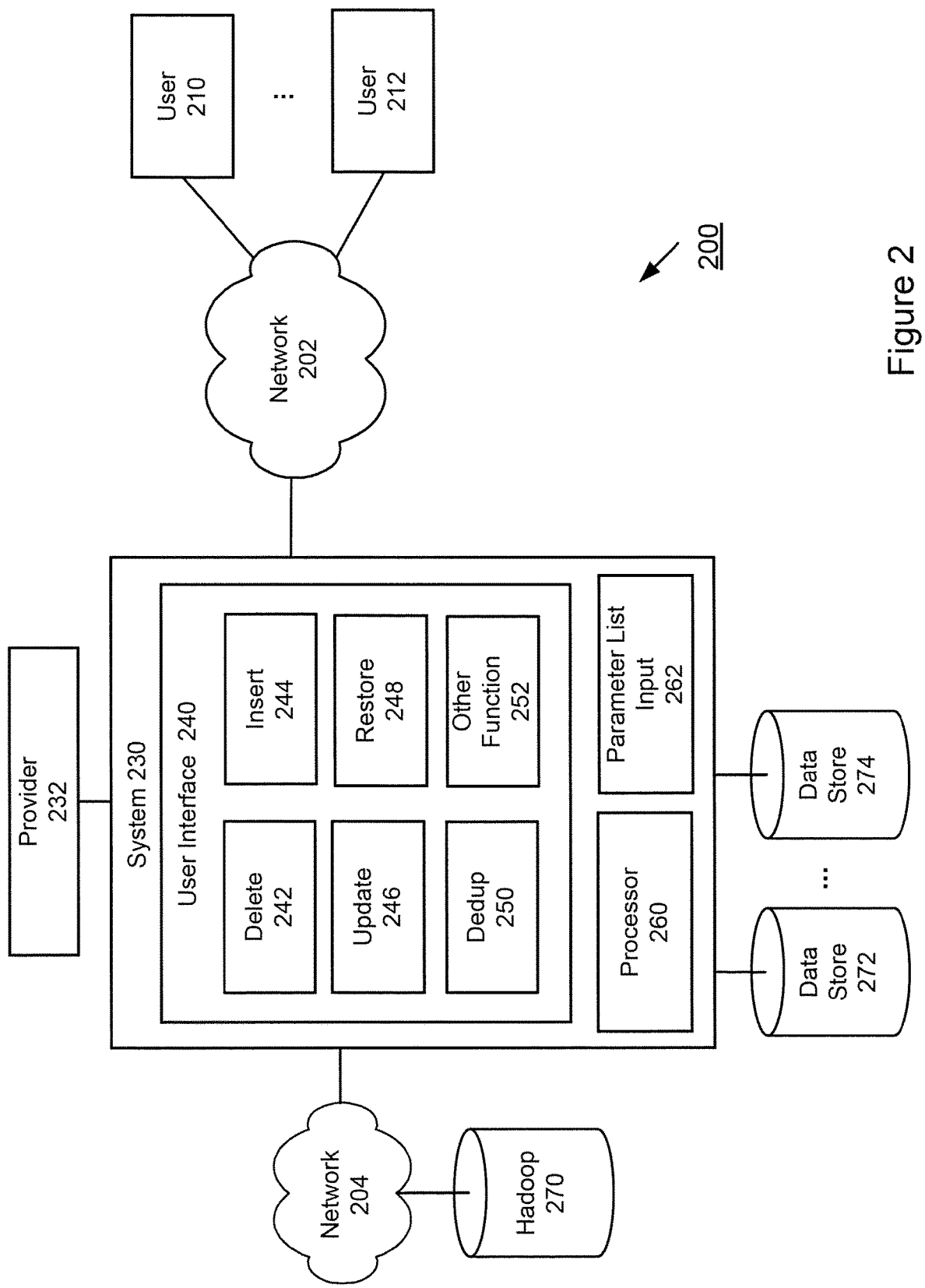
FIG. 2 is an exemplary system diagram implementing data manipulation language on Hadoop File System, according to an embodiment of the present invention.

FIG. 2 is an exemplary system diagram implementing data manipulation language on Hadoop File System, according to an embodiment of the present invention. As illustrated in FIG. 2, System 230 may be communicatively coupled, via Network 202, with one or more data devices including, for example, computing devices associated with end users, represented by User 210, 212. Users may represent developers, administrators, managers, business users, etc. Computing devices may include computers, laptops, workstations, kiosks, terminals, tablets, mobile devices, mobile phones, smart devices, etc. System 230 may include a User Interface 240, Processor 260, Parameter List Input 262. Other variations may be implemented.

In accordance with the various features of an embodiment of the present invention, System 230 may implement data manipulation language features. User Interface 240 may provide various functions to the user, including Delete 242, Insert 244, Update 246, Restore 248 and Dedup 250. Other functions may be represented by Other Function 252. These modules, components and functions are exemplary and illustrative, System 230 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

System 230 may be communicatively coupled to data storage devices represented by Data stores 272, 274. System 230 may interface with various other storage systems, including distributed systems, such as Hadoop 270. The data manipulation language functionality described herein may be provided by System 230 and/or a third party provider, represented by 232, where Provider 232 may operate with Entity 230.

System 200 of FIG. 2 may be implemented in a variety of ways. Architecture within system 200 may be implemented as hardware components (e.g., module) within one or more network elements. It should also be appreciated that architecture within system 200 may be implemented in computer executable software (e.g., on a tangible, non-transitory computer-readable medium) located within one or more network elements. Module functionality of architecture within system 200 may be located on a single device or distributed across a plurality of devices including one or more centralized servers and one or more mobile units or end user devices. The architecture depicted in system 200 is meant to be exemplary and non-limiting. For example, while connections and relationships between the elements of system 200 is depicted, it should be appreciated that other connections and relationships are possible. The system 200 described below may be used to implement the various methods herein, by way of example. Various elements of the system 200 may be referenced in explaining the exemplary methods described herein.

Network 202, 204 may be a wireless network, a wired network or any combination of wireless network and wired network. Although Network 202, 204 is depicted as one network for simplicity, it should be appreciated that according to one or more embodiments, Network 202, 204 may comprise a plurality of interconnected networks, such as, for example, a service provider network, the Internet, a cellular network, corporate networks, or even home networks, or any of the types of networks mentioned above. Data may be transmitted and received via Network 202, 204 utilizing a standard networking protocol or a standard telecommunications protocol.

Data Stores 272, 274 may represent any suitable data structure to maintain the information and allow access and retrieval of the information. For example, the storage components may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein. The storage may be local, remote, or a combination. Communications with the storage components may be over a network, such as Network 202, 204, or communications may involve a direct connection between the various storage components and System 230, as depicted in FIG. 2. The storage components may also represent cloud or other network based storage.

Figure 3:
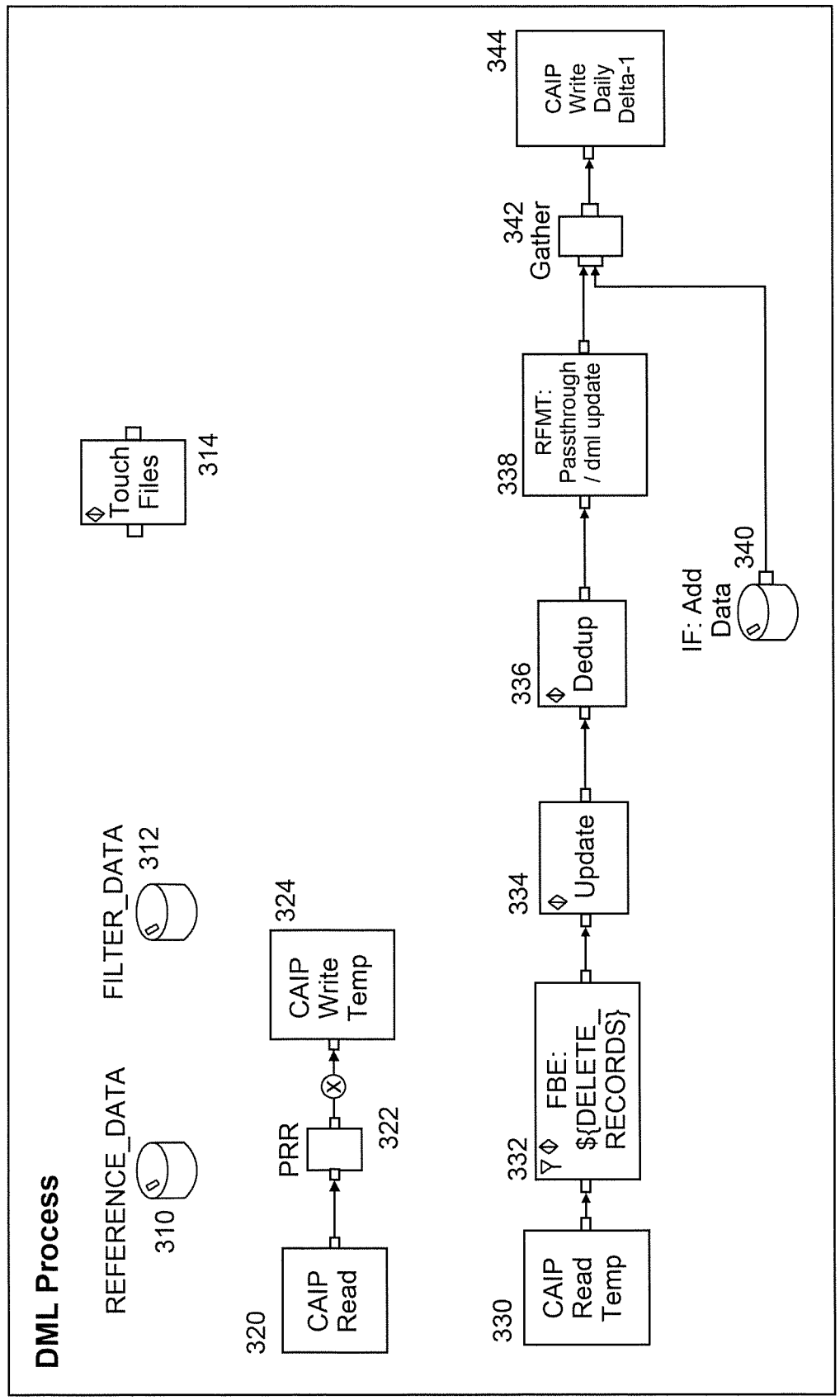
FIG. 3 is an exemplary flow diagram, according to an embodiment of the present invention.

FIG. 3 is an exemplary flow diagram, according to an embodiment of the present invention. FIG. 3 represents a screenshot of code base written to support DML operation in accordance with an embodiment of the present invention. As shown in FIG. 3, data sources represented by Reference Data 310, Filter Data 312 and Touch Files 314 may be available. FIG. 3 also illustrates a Read function 320 and Write function 324. Read and write functions may be specific to ETL components. For example, CAIP may represent a custom common component provided to perform reading and/or writing of data into HDFS environments. PRR 322 may represent Partition by Round Robin which is a logical methodology. As shown in FIG. 3, various actions may be available, including Read 330, Delete 332, Update 334, De-dup 336, pass through/DML update 338, Gather 342, Write 344 and conditional statements represented by 340. In FIG. 3, FBE may represent "Filter By Expression" which is a logical methodology. RFMT may represent "Reformat" which is a data formatting methodology. Other ETL components may be implemented. Each component represented in FIG. 3 may be conditionally enabled depending an input parameter file and then perform a set of actions on a Hadoop target dataset.

Figure 4:
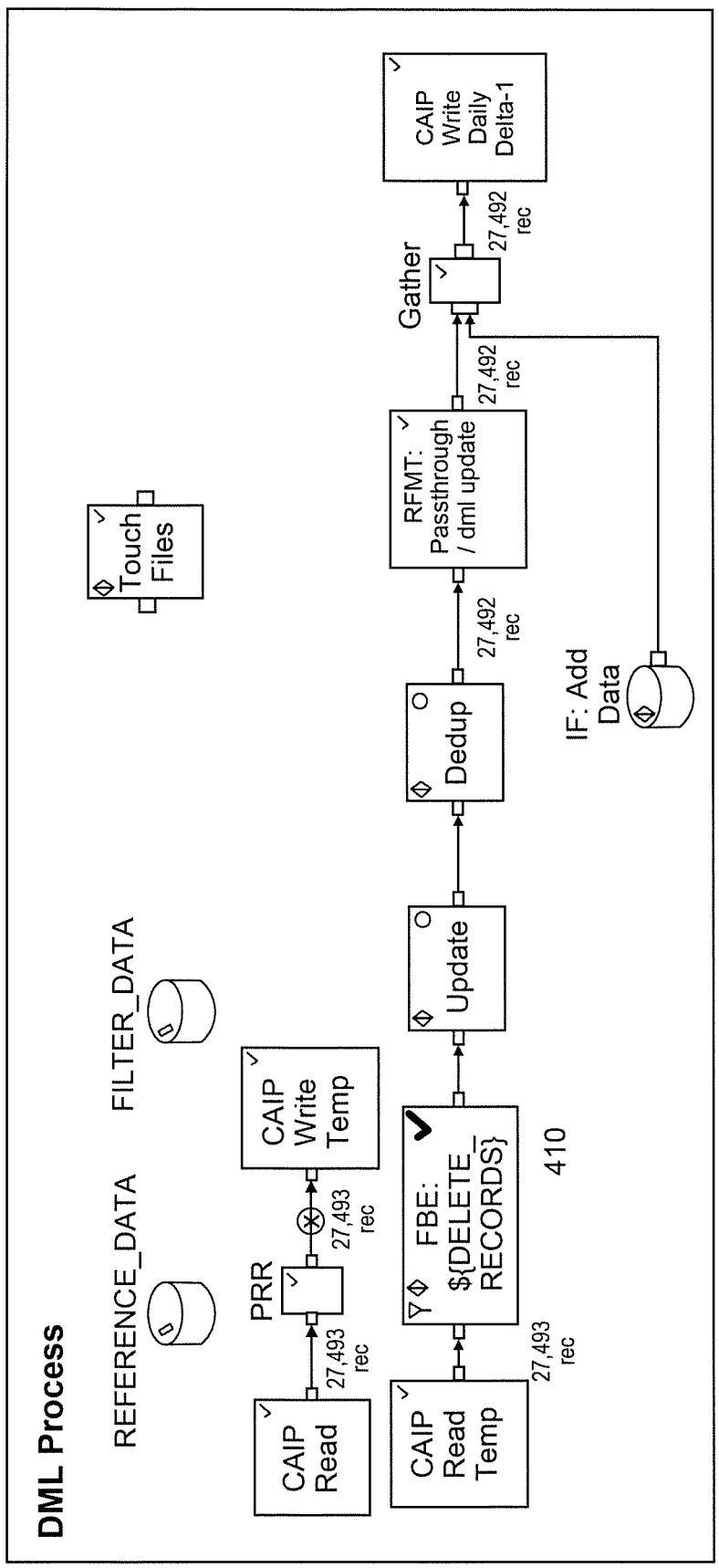
FIG. 4 is an exemplary screenshot of a DML interface, according to an embodiment of the present invention.

FIG. 4 is an exemplary screenshot of a DML interface, according to an embodiment of the present invention. A parameter may be received at input 262, as shown in FIG. 2. An exemplary parameter list may include various combinations of parameters including SOR_NAME (provides system of record name); ENTITY_NAME (provides entity or target data structure which requires any type of DML operation); BUS_DT (target entity data pertaining to a particular business day snapshot, which requires DML operation); PREVIOUS_BUS_DT (previous business day snapshot of target entity data); REFERENCE_DATA (lookup data which may be used to perform updates, e.g., update the description for a specific list of codes); FILTER_DATA (filter the specified data set provided in the lookup); REFERENCE_LOOKUP_KEY (column name which may be used to perform lookup in reference file); FILTER_LOOKUP_KEY (column name which may be used to perform lookup in filter file); DELETE_RECORDS (delete records from target entity based on the specified column); UPDATE_CONDITION (update records from target entity based on the specified condition (if 1 is specified, it may be performed on all records); DEDUP_KEY (perform de-dup on target entity based on the key specified); ACTION (specify DML action which is required to be perform on target entity, DML action may include delete, insert, update and de-dup); ACTION1; ACTION 2; ACTION 3; COUNTER (in case of rollback, specify the backup version which needs to be used); UPDATE_XFR (specify a transformation logic which may be used to perform update on target entity); RESTORE_ONLY_FLAG (in case of rollback, specify "Y" to perform the rollback).

An embodiment of the present invention is directed to execution screenshots. For a Delete scenario, an exemplary parameter file may be represented as:

```
$ cat LOAN.input
SOR_NAME:MB0PT_LANE_1.MSP###
ENTITY_NAME:LOAN
BUS_DT:20170517
PREVIOUS_BUS_DT:20170516
BASEDIR:/tmp
REFERENCE_DATA:/tmp/LOAN.dat
FILTER_DATA:/tmp/LOAN.dat
REFERENCE_LOOKUP_KEY:loan_number
FILTER_LOOKUP_KEY:loan_number
DELETE_RECORDS:loan_number != '    48    '
UPDATE_CONDITION:
DEDUP_KEY:
ACTION:Delete
ACTION1:None
ACTION2:None
ACTION3:None
OUTPUT_ENTITY_DML:
COUNTER:1
UPDATE_XFR:
RESTORE_ONLY_FLAG:N
PAYLOAD_ID:
[1######@bdt###r6n14]  /home/1######
$
```

In this example, the system may filter a record based on a condition specified in the parameter file. Responsive to the parameter file, an embodiment of the present invention may then delete the filtered record from a target dataset. More specifically, function 410 may delete the record from the received 27,493 records. As shown in FIG. 4, the filtered record does not get written into a target data set, e.g., it got deleted. Total record count has been reduced by 1 (from 27,493 to 27,492).

For an Update scenario, an exemplary parameter file may be represented as:

```
[i######@bdt###r6n14]  /home/1######
$  cat LOAN.input
SOR_NAME:MB0PT_LANE_1.MSP###
ENTITY_NAME:LOAN
BUS_DT:20170517
PREVIOUS_BUS_DT:20170516
BASEDIR:/tmp
REFERENCE_DATA:/tmp/LOAN.dat
FILTER_DATA:/tmp/LOAN.dat
REFERERCE_LOOKUP_KEY:loan_number
FILTER_LOOKUP_KEY:loan_number
DELETE_RECORDS:1
UPDATE_CONDITION:1
DEDUP_KEY:
ACTION:Update
ACTION1:None
ACTION2:None
ACTION3:None
OUTPUT_ENTITY_DML:
COUNTER:1
UPDATE_XFR:/tmp/loan.xfr
RESTORE_ONLY_FLAG:N
PAYLOAD_ID:
[1######@bdt###r6n14]  /home/1######
```

Transformation logic may be used to perform the update as follows:

```
[i######@bdt###r6n14]  /home/1######
$  cat /tmp/loan.xfr
out :: reformat(in) =
begin
    out.* :: in.*:
    out.first_principal_balance :: in.first_principal_balance + 100
end;
[1######@bdt##r6n14]  /home/1 ###
```

Figure 5:
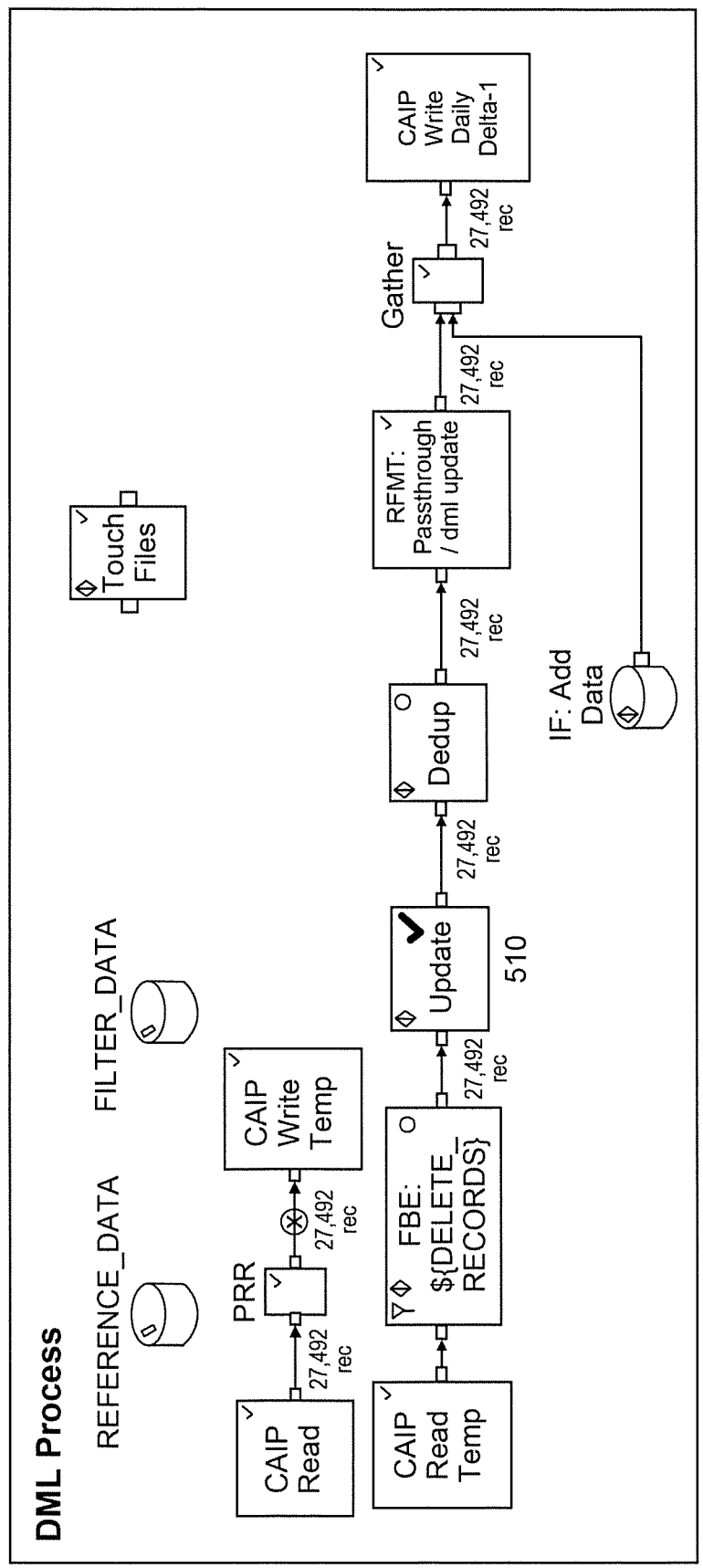
FIG. 5 is an exemplary screenshot of a DML interface, according to an embodiment of the present invention.

FIG. 5 is an exemplary screenshot of a DML interface, according to an embodiment of the present invention. In this example, the update scenario is being executed. As shown in FIG. 5, update component 510 has been enabled to perform an update on "first_principal_balance" column for all records in target data set as specified by the above transformation logic.

The result may include an update of a "First_principal_balance" column. An embodiment of the present invention may execute an update DML, which may include a $100 increase on "First_principal_balance" column. In this example, a value of $100 is added to first_principal_balance as specified in the DML logic.

Figure 6:
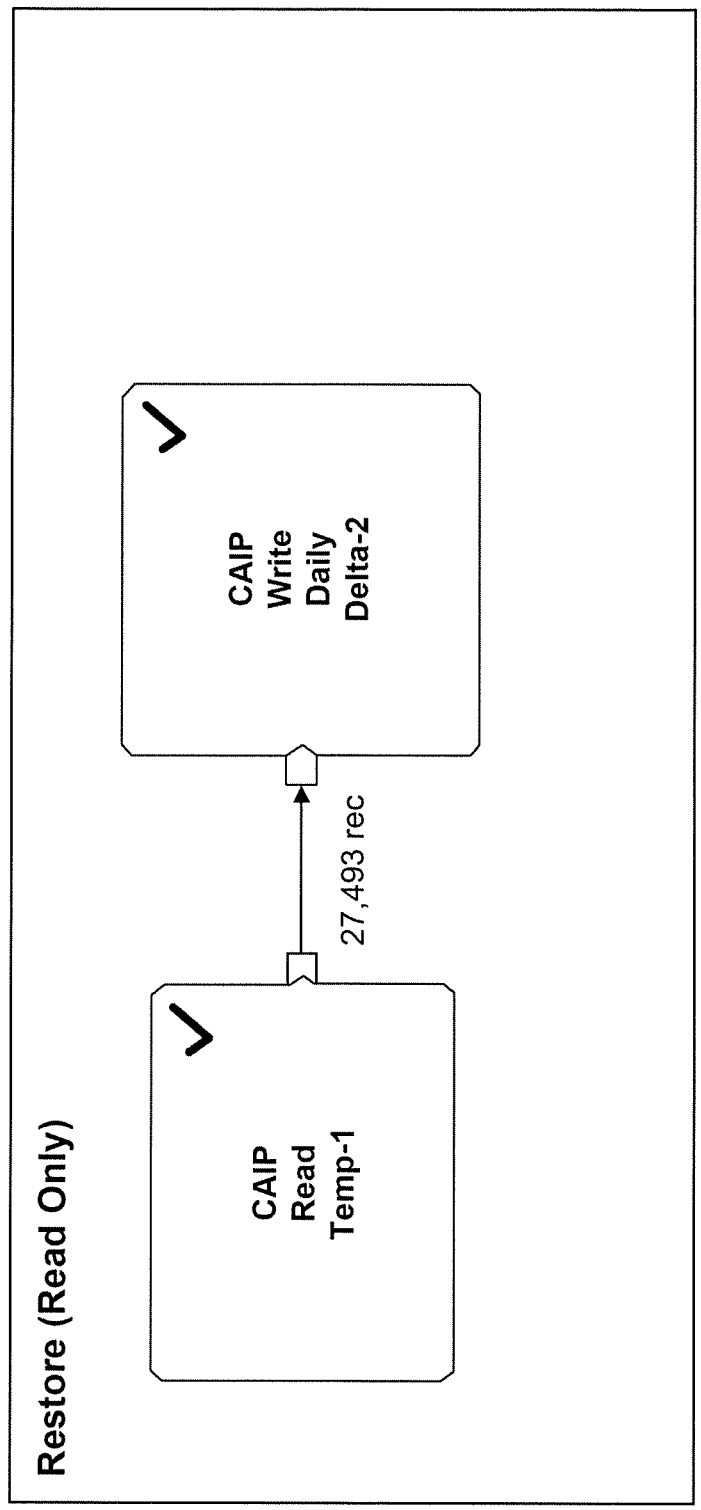
FIG. 6 is an exemplary screenshot of a DML interface, according to an embodiment of the present invention.

FIG. 6 is an exemplary screenshot of a DML interface, according to an embodiment of the present invention. For a Rollback scenario, a Restore process executes and DML process may be disabled. FIG. 6 shows that only rollback action has been performed in this iteration. In case of any erroneous operation during DML execution, this option provides rollback of DML operation to its previous dataset. It also provides versioning capability to backup dataset prior to DML execution. In case an end user wants to rollback to specific version, a respective version number may be provided against input parameter "counter:"

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements data manipulation language on Hadoop execution procedures, the system comprising:
   a user interface that receives user input;
   a memory component that stores data manipulation data; and
   a computer server coupled to the user interface and the memory, the computer server comprising a programmed computer processor configured to perform the steps of:
   receiving, via the user interface, an input parameter file that identifies a target data structure in a Hadoop Distributed File System (HDFS) and a data manipulation language (DML) operation comprising insert, delete, and de-duplicate to be performed on the target data structure;
   identifying, via a metadata repository within the HDFS, an encrypted file name corresponding to the target data structure;
   accessing the encrypted file name from a dataset of encrypted files maintained in the HDFS;
   reading a dataset corresponding to the encrypted file name;
   performing the insert, delete, or de-duplicate DML operation in a single iteration on the corresponding HDFS file to create an updated HDFS file by employing a filter by expression logical methodology;
   writing the updated HDFS file in a partition by round robin logical methodology; and
   providing roll-back capability by maintaining a backup of the original corresponding HDFS file.

2. The system of claim 1, wherein the data manipulation language enables one or more actions to be performed, wherein the one or more actions comprise Insert, Update, Delete, and De-Dup.

3. The system of claim 1, wherein the one or more data manipulation language operations are provided natively on Hadoop.

4. The system of claim 1, wherein the rollback option creates a backup of an original dataset with versioning data.

5. The system of claim 4, wherein the backup is stored at the HDFS.

6. The system of claim 1, wherein the input parameter file further comprises transformation logic to perform a DML operation.

7. The system of claim 1, wherein the input parameter file comprises current business day snapshot data and previous business day snapshot data.

8. The system of claim 1, wherein the input parameter file comprises reference data, filter data and one or more DML actions.

9. A method that implements data manipulation language on Hadoop execution procedures, the method comprising the steps of:
   receiving, via a user interface, an input parameter file that identifies a target data structure in a Hadoop Distributed File System (HDFS) and a data manipulation language (DML) operation comprising insert, delete, and de-duplicate to be performed on the target data structure;
   identifying, via a metadata repository within the HDFS, an encrypted file corresponding to the target data structure;
   accessing the encrypted file from a dataset of encrypted files maintained in the HDFS;
   reading a dataset corresponding to the encrypted file name;
   performing the insert, delete, or de-duplicate DML operation in a single iteration on the corresponding HDFS file to create an updated HDFS file by employing a filter by expression logical methodology;
   writing the updated HDFS file in a partition by round robin logical methodology; and
   providing roll-back capability by maintaining a backup of the original corresponding HDFS file.

10. The method of claim 9, wherein the data manipulation language enables one or more actions to be performed, wherein the one or more actions comprise Insert, Update, Delete, and De-Dup.

11. The method of claim 9, wherein the one or more data manipulation language operations are provided natively on Hadoop.

12. The method of claim 9, wherein the rollback option creates a backup of an original dataset with versioning data.

13. The method of claim 12, wherein the backup is stored at the HDFS.

14. The method of claim 9, wherein the input parameter file further comprises transformation logic to perform a DML operation.

15. The method of claim 9, wherein the input parameter file comprises current business day snapshot data and previous business day snapshot data.

16. The method of claim 9, wherein the input parameter file comprises reference data, filter data and one or more DML actions.

* * * * *